United States Patent [19]
Spurgin

[11] Patent Number: 5,653,206
[45] Date of Patent: Aug. 5, 1997

[54] OIL COOLER FOR A MOTORCYCLE

[76] Inventor: Robert E. Spurgin, 8604 Alfano Ct., Las Vegas, Nev. 89117

[21] Appl. No.: 674,719

[22] Filed: Jul. 2, 1996

[51] Int. Cl.⁶ ..................................................... F01M 5/00
[52] U.S. Cl. .................. 123/196 AB; 184/104.3; 180/68.4; 180/229
[58] Field of Search ................. 123/196 AB, 41.33; 184/104.3; 180/229, 68.1

[56] References Cited

U.S. PATENT DOCUMENTS

| | | |
|---|---|---|
| 2,281,859 | 5/1942 | Reeves . |
| 2,781,859 | 2/1957 | Warren .................. 123/196 AB |
| 2,824,724 | 2/1958 | Porsche . |
| 4,445,587 | 5/1984 | Hillman . |
| 4,640,341 | 2/1987 | Ozawa .................. 123/41.33 |
| 4,662,470 | 5/1987 | Fujisawa et al. . |
| 4,687,069 | 8/1987 | Inomata et al. .................. 123/41.33 |
| 4,690,236 | 9/1987 | Shinozaki et al. .................. 123/41.33 |
| 4,848,453 | 7/1989 | Evans . |
| 4,902,059 | 2/1990 | Tritton . |
| 4,971,171 | 11/1990 | Yamada et al. .................. 123/41.33 |
| 5,244,036 | 9/1993 | Michl . |
| 5,307,865 | 5/1994 | Inagaki et al. .................. 123/196 AB |

FOREIGN PATENT DOCUMENTS

| | | | |
|---|---|---|---|
| 3168316 | 7/1991 | Japan | .................. 123/41.33 |
| 709742 | 6/1954 | United Kingdom | .................. 123/196 AB |

Primary Examiner—Erick R. Solis
Attorney, Agent, or Firm—Quirk & Tratos

[57] ABSTRACT

A system is set forth for cooling the circulating oil of an air cooled motorcycle engine having an oil pump and a mount for an oil filter, oil from the pump delivered to the filter and from the filter back to the engine for re-circulation. The system includes an engine guard secured to the motorcycle, at least a portion of the guard defining a closed chamber having a supply end and a return end. A diverter disposed between the filter and mount is adapted to direct oil to the chamber supply end, through the chamber for cooling thereof and, from the return end back to the diverter for supply to the filter and return to the engine. An adapter is disposed between the diverter and filter for certain model engines to turn the mount, diverter filter assembly so that the system can be provided for these engines.

16 Claims, 4 Drawing Sheets

OIL COOLER FOR A MOTORCYCLE

FIELD OF THE INVENTION

The present invention relates to motorcycles and more particularly to oil coolers for air cooled motorcycle engines.

BACKGROUND OF THE INVENTION

Some types of motorcycles have air cooled engines. Notably, motorcycles manufactured by Harley-Davidson Motorcycle Company of Milwaukee, Wis. have large displacement, four stroke, air cooled engines. As is well known, these engines have an oil pump which circulates oil through the engine to lubricate the components thereof and to carry away the accumulated heat of combustion and friction. Under normal operations for a motorcycle of the type described above having a displacement of 80 cubic inches, the oil pump has a discharge pressure of about 12 to 14 PSI. To assure proper circulation and lubrication, it is important that the pressure be maintained. A significant drop in oil pressure can result in damage to engine components.

As is also well known, engines of the type described have replaceable oil filters which are coupled to the engine by suitable means to filter the oil. Typically a mount having a threaded port is presented to threadably mount the filter. The port has an axial bore through which oil from the filter is returned to the engine for re-circulation by the oil pump. The filter has a threaded center bore such that the filter can be threaded and unthreaded from the port. To supply oil to the filter, disposed about the port are one or more openings through which oil from the engine delivered by the oil pump is supplied to the filter. Hence, the oil is pumped through the engine for a lubrication and heat transfer, from the openings and into the filter. Oil passes through the filtering media of the filter and returns to the crank case through the port axial bore.

With continuing reference to the engine of the type described above, the cooling of the engine is carried about by providing fins on the cylinder block. When the motorcycle is moving, forced convection heat transfer occurs to carry away heat.

In stagnant air flow conditions such as when the motorcycle is stopped and running, and particularly in elevated ambient conditions such as in high heat and humidity, the temperature of the oil may rise to such a level that oil pressure is lost. In those circumstances the operator of the motorcycle must turn off the engine or risk damage thereto. The forgoing is true particularly for police motorcycles of the type described above which may be stopped in traffic or involved in slow moving, stop and go traffic. Under these conditions and in the engines of the type described above, insufficient cooling takes place to maintain oil pressure.

In the past, efforts have been made to provide additional oil cooling. For example, in Michl, U.S. Pat. No. 5,244,036, an oil cooler for motorcycle is shown. With reference to FIG. 1 herein, a motorcycle 10, of the type described above, is generically illustrated. The motorcycle 10 has a front wheel assembly 12 including a front wheel 14 and a front fork suspension 16 as is well known in the art. A rear wheel assembly 18 is also provided, both the front wheel and rear wheel assemblies 12 and 18 coupled to a motorcycle frame 20. An engine 22 provides power for the motorcycle 10. Foot pegs 24 provide a resting place for the operators feet. According to this reference, an oil cooler 26 is attached to the motorcycle frame 20 to follow the inverted v-shape pattern of the front portion of the motorcycle frame 20. This oil cooler is supplied with oil from the discharge of an oil filter 28 positioned between the frame 20 and engine 22 and transversely to the direction of travel for the motorcycle 10. The oil circulates through the oil cooler 26 and is returned to the oil reservoir for the motorcycle.

A drawback of prior oil coolers of the type described above, is that their close proximity to the engine does not provide for efficient cooling of the oil. Heat from the engine 22 transferred to the environment, particularly in stagnant conditions when the motorcycles not moving, will increase ambient temperature conditions about the oil cooler 26 effecting the efficiency thereof.

Furthermore, the oil coolers of the type described above provide no other function than as an oil cooler. It is a component which has no other utility than to operate as an oil cooler.

Still further, the location of the oil cooler 26 described, limits the service area available for cooling in that it is coupled to the frame 20. Still further, debris such as dirt and mud thrown up by the front wheel 14 may effect the heat transfer capabilities of the oil cooler.

It is therefore desirable to provide an oil cooler which overcomes these drawbacks.

Unrelated to oil coolers, and further by way of background, it has been known to provide motorcycles with an engine guard, sometimes referred to as a crash bar, mounted to the motorcycle frame to project to either side of the engine. These engine guards protect the engine components should the motorcycle fall to the side and in such event, may also provide the additional benefit of protecting the rider's legs. For Harley-Davidson motorcycles of the type described above, these engine guards may have an inverted U-shape and may be 80 inches long or more with an outside diameter of 1.25 inches. Typically, these engines guards, for purposes of appearances, have a chrome finish.

Heretofore, the art of oil coolers and engine guards have been unrelated.

SUMMARY OF THE INVENTION

There is provided, therefore, according to the various embodiments of the present invention, as system for cooling oil for an air cooled motorcycle engine of the type like those manufactured by Harley-Davidson Motorcycle Company, which provides the functions of an oil cooler and an engine guard. This system is easy to install, unobtrusive and effective.

Accordingly, there is set forth a system for cooling oil for an air cooled motorcycle engine of the type having an oil pump and oil filter and means for mounting the filter to the engine, the mounting means including an opening to deliver oil from the engine to the filter and a port for receiving oil returning from the filter and returning it to the engine. The system includes a hollow engine guard adapted to be secured to the motorcycle, and more particularly, to its frame. At least a portion, and preferably the entire length of the engine guard, defines a closed chamber having a supply end and a return end.

A diverter is adapted to be disposed between the filter and engine to divert oil discharged from the oil pump and engine to the engine guard inlet for circulation through the chamber and for directing the oil from the engine guard outlet back to the filter for filtering thereof. Accordingly, oil delivered from the engine, after having lubricated components and picked up heat from the engine, is delivered to the engine guard through which it circulates before returning to the filter. From the filter, the oil is returned to the engine for recirculation by the oil pump. As can be appreciated, the engine guard thereby acts as an oil cooler as well as an engine guard.

According to other embodiments, a thermostat bypass can be provided such that the diversion of oil from the filter to the engine guard only occurs where oil temperatures are above a pre-selected value such as 180 degrees Fahrenheit. Below that temperature, oil delivered from the engine is past by the diverter and delivered to the filter, for filtering, and returned from the filter to the engine. At 180 degrees Fahrenheit or any other preselected value or higher, the oil is diverted to the engine guard for cooling.

In yet a further embodiment, for Harley-Davidson motorcycles of the type described for the model years 1996 or later which are of the fuel injection type, the system, according to the present invention, further includes an angular adapter disposed between the diverter and filter. The angular adapter is constructed to turn the path of connection of the filter to the engine so as to avoid interference with components provided on these model year motorcycles. In the preferred embodiment of the adapter, the adapter turns the path of connection of the filter 90 degrees such that the filter is connected in a direction to project forwardly of the engine and frame. In this manner, the diverter and filter, with the adapter, may be coupled to these model year motorcycles. As an added feature, with the adapter, filters of larger sizes can be used to increase the oil supply available to the engine.

The system, according to the various embodiments of the present invention, provides for not only an engine guard for the engine, but an oil cooler as well. Still further, the system, according to the present invention, increases the supply of oil available to the engine. For certain model years, the system including the adaptor enables larger size filters to be used, further increasing the quantity of oil in the system. Still further, the system provides for the oil cooler to be upstream of the filter such that the filter can remove any debris which may be collected by the oil from the oil cooler.

BRIEF DESCRIPTION OF THE DRAWINGS

These and other features and advantages will become appreciated as the same becomes better understood with reference to the specification claims and drawings wherein:

DETAILED DESCRIPTION OF THE PREFERRED EMBODIMENT

Figure 2:
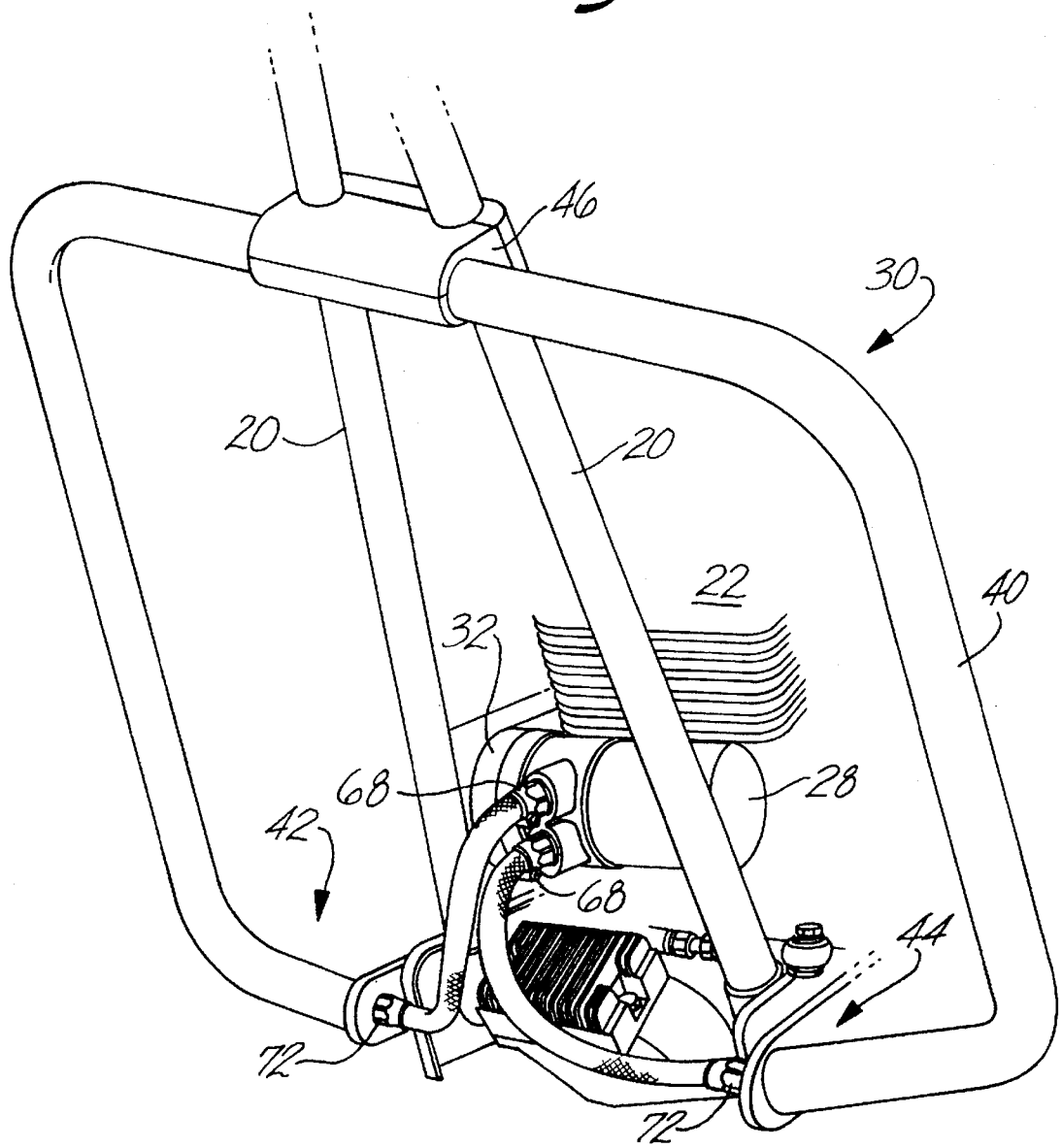
FIG. 2 is a perspective front view of one embodiment of the system according to the present invention.

Turning to FIG. 2, one embodiment of a system 30 for employment with an air cooled motorcycle 10 of the type described above is shown. For purposes of clarity, only a portion of the engine 22 is shown.

Figure 1:
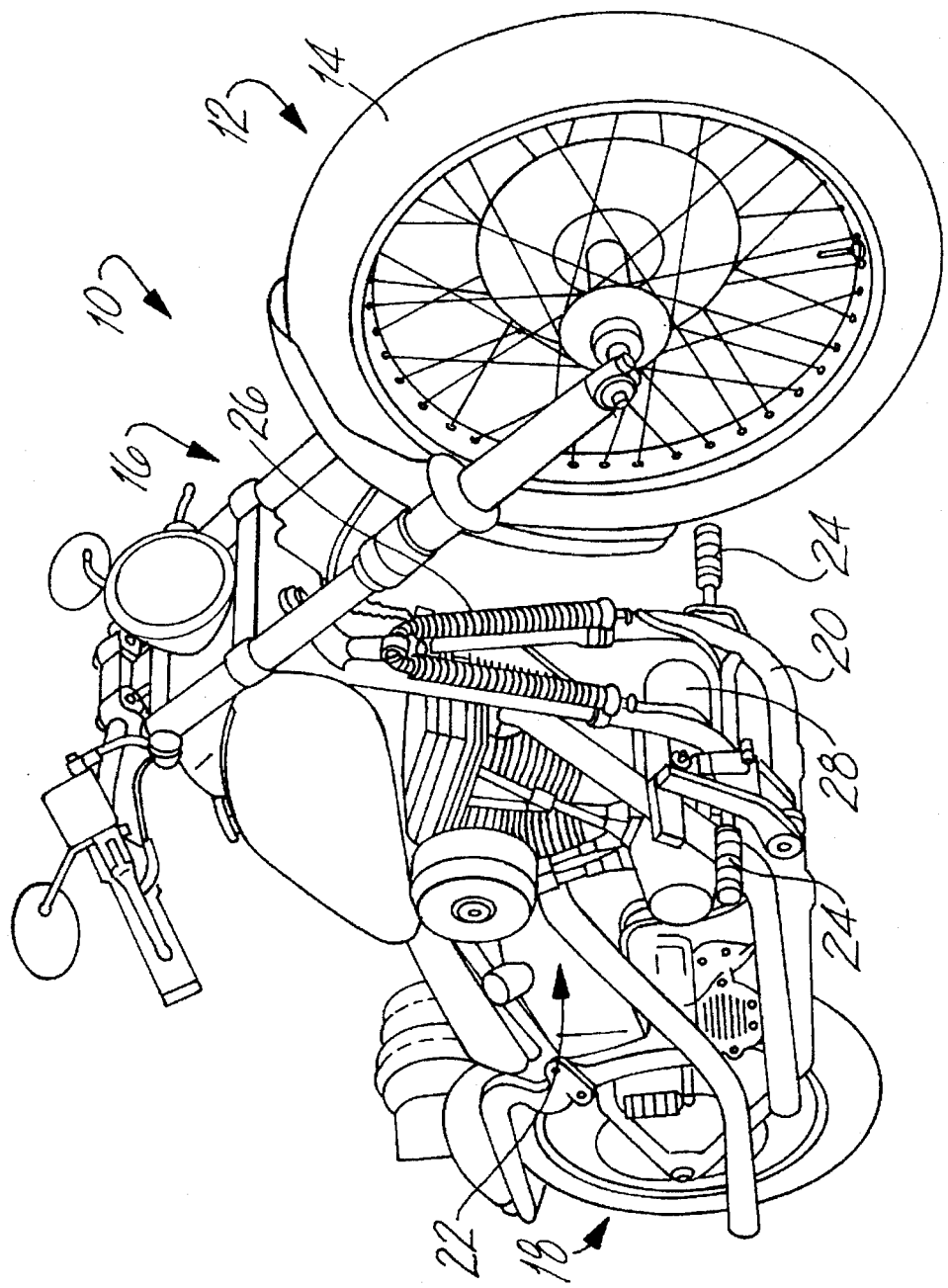
FIG. 1 is a front-side perspective view of a motorcycle having mounting thereon an oil cooler according to the prior art.
Figure 3:
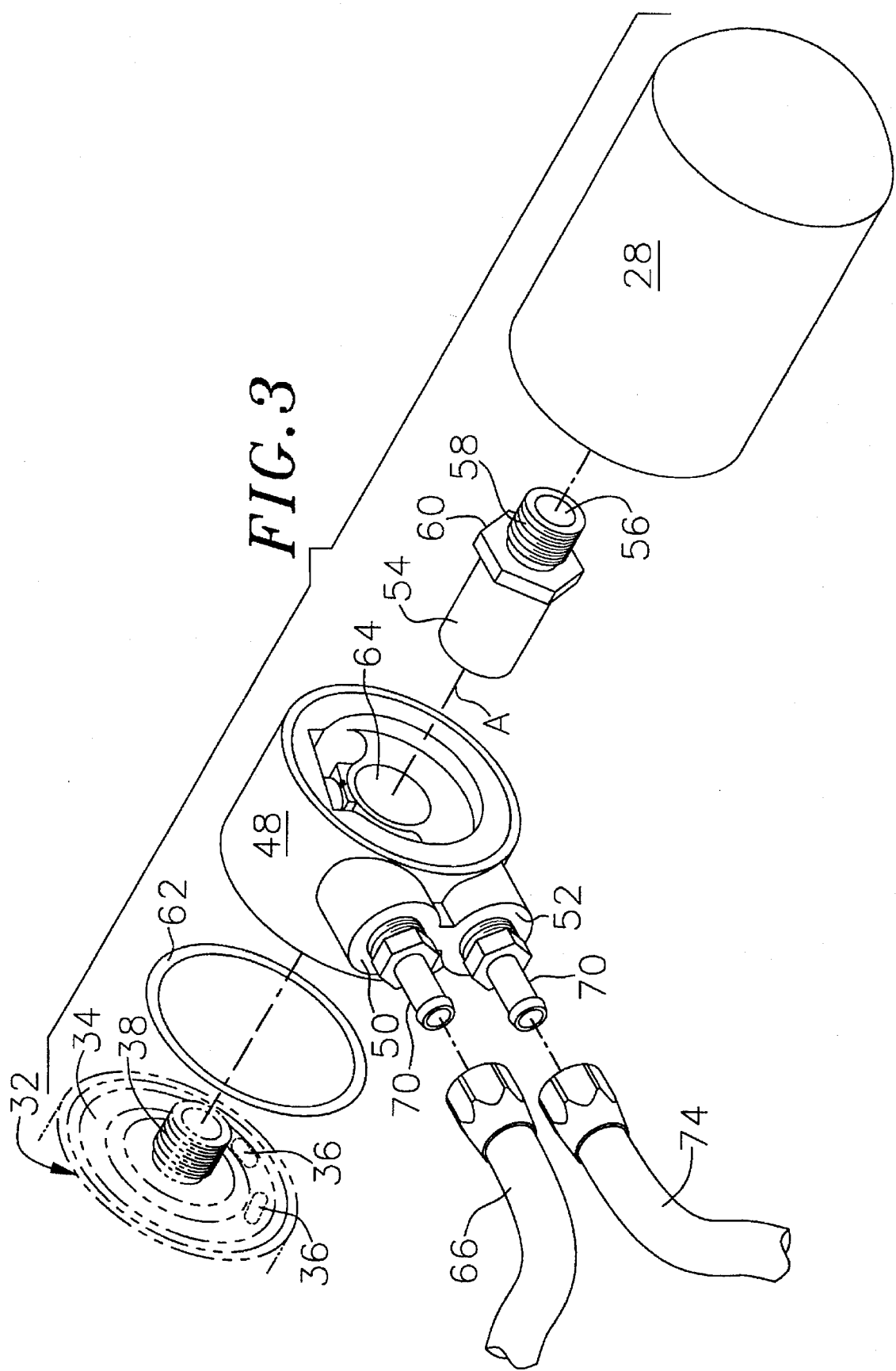
FIG. 3 is an exploded view of a portion of the system of FIG. 2.

For Harley-Davidson Motorcycles of the type having a displacement of 80 cubic inches and for the model years 1992 through 1996, the system 30 for oil cooling is provided. For these model years, the engine includes an oil filter mount 32 adapted to mount an oil filter 28 in a direction transverse to the direction of travel for the motorcycle. That is, as shown in FIG. 1, the oil filter 28 is disposed horizontally in front of the engine to extend transversely to the direction of travel for the motorcycle. With reference to FIG. 3, the mount 32 presents a circular face 34 having at least one and typically a plurality of annularly disposed supply openings 36 and an axially disposed, externally threaded oil return port 38. As is known in the art, the oil filter 28 includes an axial, threaded center bore adapted to threadly receive to the return port 38 and a plurality of annularly disposed filter openings (not shown) which, when the filter 28 is mounted to the mount 32, are in communication with the supply openings 36. Oil from the motorcycle oil pump is circulated through the engine to lubricate parts and remove heat and is supplied through the supply openings 36 to the filter openings of the replaceable oil filter 28. The oil supplied to the filter 28 passes through filtering media contained therein and is discharged from the oil filter 28 through the axial center bore and return port 38 back to the engine to resupply the oil pump. To provide a seal between the oil filter 28 and the mount 32, the oil filter 28 has an elastomer gasket (not shown).

To provide additional cooling for the oil, according to this embodiment of the present invention, the motorcycle is provided with a engine guard 40, secured to the motorcycle frame 20, to project to either side of the engine 22 ahead of the foot pegs 24 (FIG. 1), to provide protection to the engine components should the motorcycle tip over. The engine guard 40 has an inverted U-shape with a first end 42 and a second end 44 secured to the frame 20 by suitable fasteners (not shown). As described above, the engine guard 40 may have a total length from the first end 42 to the second end 44 of about 80 inches and an outside diameter of approximately 1.25 inches. For appearances, it may have a chrome finish. Opposite the first and second ends 42 and 44, a bracket 46 couples the engine guard 40 to the frame 20.

The engine guard 40 is hollow to define a chamber therein which may be coextensive with the engine guard extending from the first end 42 to the second end 44 or it may, unpreferably, be defined by only a portion of the engine guard 40. At the first end 42 is defined a supply for the chamber and at the second end 44 is a discharge.

With continuing reference to FIGS. 2 and 3, to cooperate with the engine guard 40, the system 30, according to the present invention, includes a diverter 48 disposed between the filter 28 and filter mount 32. Preferably the diverter is of the type manufactured by Hayden, Inc., of Corona, Calif. and supplied with its model 205 adapter kit. The diverter 48 is coupled between the filter 28 and mount 32 and includes a first channel communicating with the mount supply openings 36 and adapted to supply oil delivered therefrom to a diverter outlet 50. A second channel within the diverter 48 is adapted to provide communication between a diverter inlet 52 and the supply openings for the filter 28.

To secure the diverter 48 to the mount 32, a mounting nut 54 is provided. The mounting nut 54 has an axial through bore 56 and at one end, a threaded female fitting to be threadly coupled to the return port 38. At the other end, the nut 54 has a threaded head 58 to threadably mount the filter 28 in the manner described above. Accordingly, the oil supplied to the diverter 48 at the inlet 52 is supplied to the filter 28 and the oil is returned through the nut 54 and return port 38 to the engine. As illustrated in FIG. 3, the nut 54 has a hexagonal flange 60 adapted to clamp the diverter 48 to the mount 32 in the manner described above.

To provide a seal between the diverter 48 and mount 32, an elastomeric ring 62 is disposed between the mount 32 and diverter 48.

Accordingly, to secure the diverter 48 to the mount 32, the ring 62 is disposed to mate with a corresponding annular seat of the diverter 48. The filter 28 is removed from the mount 32 and the diverter 48, with its ring 62, is placed against the mount 32. Thereafter the nut 54 is inserted through a center bore 64 of the diverter 48 and is threaded over the return port 38. The nut 54 is tightened such that the flange 60 forcibly clamps the diverter 48 to the mount 32. Thereafter the filter 28 is threaded to the head 58 to be coupled to the diverter 48. As can be appreciated, and with reference to FIG. 3, the system 30 according to the embodiment provides an assembly line A to couple the filter 28 to the mount 32 in axial alignment. For Harley-Davidson Motorcycle engines of the type described for the model years 1992 through 1996, there is sufficient space to accommodate the increased axial length of the assembly of the system 30 by virtue of the interposition of the diverter 48 between the mount 32 and filter 28.

The diverter outlet 50 is connected to the chamber supply at the first end 42 by a supply conduit 66. At the diverter outlet 50, the supply conduit 66 is connected by passing it over the outlet 50 and using a suitable hose clamp 68 which constricts the supply conduit 66 into an annular recess 70 at the outlet 50. At the other end, the supply conduit 66 is threadably coupled to a threaded supply fitting (not shown) at the first end 42. The supply conduit 66 at this end includes a threaded connector 72 to threadably and suitably connect the supply conduit 66 to the engine guard first end 42.

Similarly, the diverter inlet 52 is put into communication with the engine guard chamber by a return conduit 74. At the diverter inlet 52, the return conduit 74 is connected by a suitable hose clamp 68 which constricts the return conduit 74 into a recess 70 and at the other end by a threaded connector 72 to threadably attached it to a return fitting (not shown) at the engine guard second end 44. The first and second conduits 66 and 74 are preferably embodied as stainless steel braided hoses providing for flexibility of the connection as hereinabove described and for cooperating with the chrome surface of the engine guard 40 for a pleasing appearance.

With the system 30 according to the present invention embodied by the diverter 48 and engine guard 40 as hereinabove described, the operation of the system 30 can be appreciated. Oil supplied from the engine 22 which heretofore had previously been supplied directly to the filter 28, is diverted by the diverter 48 to the outlet 50, through the supply conduit 66 and into the chamber of the engine guard 40 at the first end 42. Oil, under the head provided by the oil pump of the engine 22, directed around and through the chamber of the engine guard 40 for discharge from the chamber discharge at the second end 44. From there, it flows through the return conduit 74 into the diverter inlet 52 and from there to the filter supply. After having passed through the filter media of the filters 28, the oil, having been cooled by the engine guard 40 and filtered by the media of the filter 28, is returned through the nut bore 56 and return port 38 to the engine.

To provide for thermostatic control of circulation of oil through the engine guard 40 for cooling thereof, the diverter 48 is also provided with the thermostat. Below a preselected temperature such as 180 degrees Fahrenheit, the thermostat is in an open condition whereupon oil discharged from the supply openings 36 is circulated from the first channel into the second channel of the diverter 48 and from there, directly to the filter 28. Accordingly, at these lower temperatures, oil is not circulated through the engine guard 40 enabling the engine by circulation of the oil to warm-up sooner. At temperatures above 180 degrees Fahrenheit, the thermostat closes to divert the oil to circulate through the engine guard 40.

Oil circulating through the engine guard 40 is cooled thereby. The engine guard 40 is spaced from the engine 20 and therefore, it is believed, provides greater cooling effect. Furthermore, the engine guard 40 has a large surface area providing for cooling of the oil. Also, use of the engine guard 40 as an oil cooler provides an oil cooler which also functions as an engine guard. Further, if there is any debris in the engine guard 40, by putting it upstream of the filter 28, any such debris is filtered prior to the oil returning to the engine.

Figure 4:
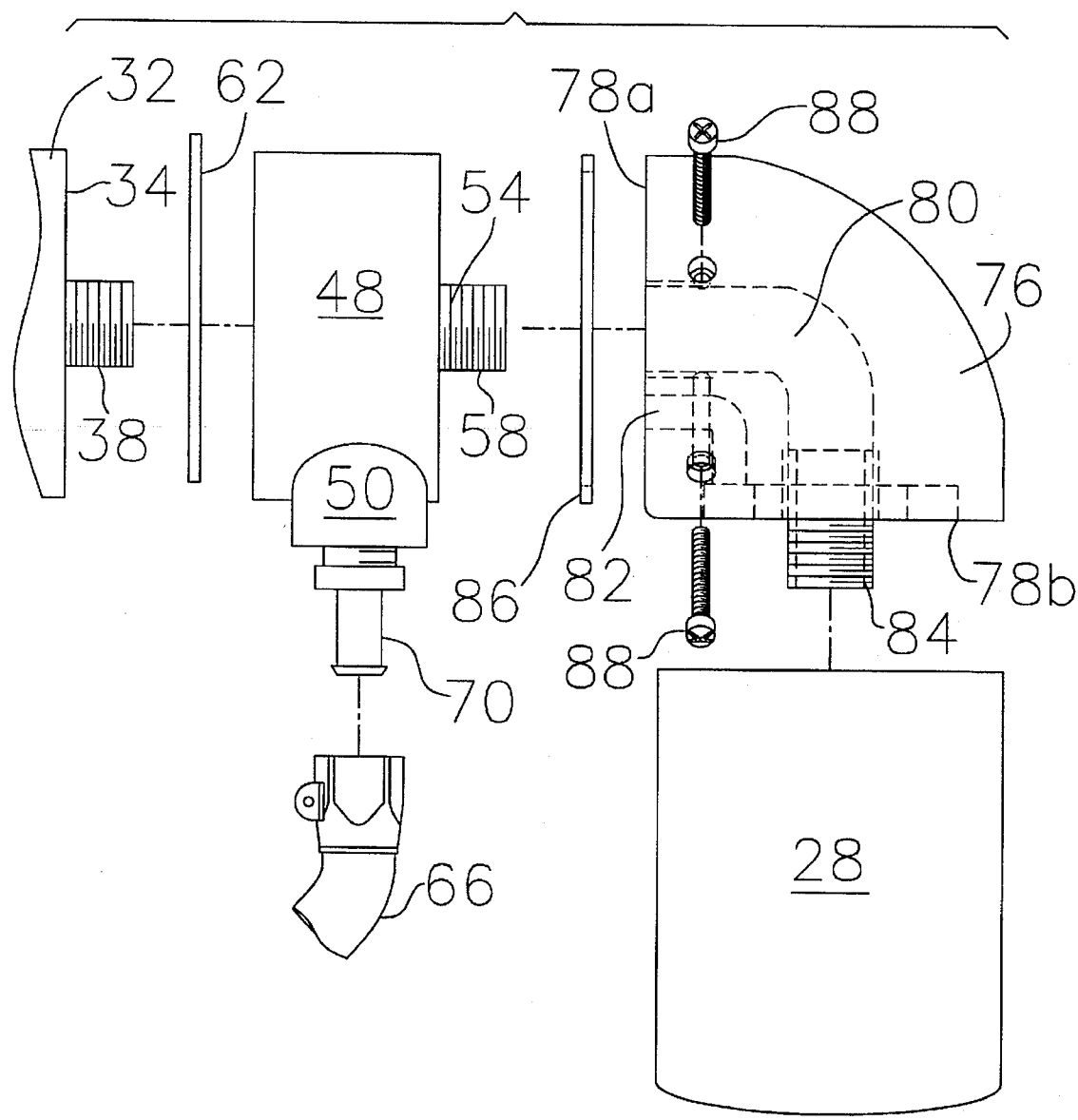
FIG. 4 is a top assembly view of a portion of a further embodiment of the present invention.

With reference to FIG. 4, another embodiment of the present invention is shown. This embodiment is particularly adapted for later model years Harley Davidson engines of the type described above, in that those engines are fuel injected. The fuel injected engines have components which do not permit for the axial length of the assembly of FIG. 3 between the mount 32 and the remote end of the filter 28 to fit within the space provided. Applying the system of FIG. 3 to these particular motorcycles is not possible due to the interference which would occur between the filter 28 and these components.

Accordingly, the embodiment of FIG. 4 includes the diverter 48 of the type described above and an adapter 76 disposed between the diverter 48 and the filter 28. The adapter 76, as shown in FIG. 4, turns the axis of the assembly approximately 90 degrees to, with reference to FIG. 1, extend the filter 28 forwardly of the engine 22 and away from the interfering components of the engine 22. The adapter 76 has a circular cross section having orthogonaly arranged circular surfaces 78a and b. The surfaces are planar, with surface 78a adapted to mate with the diverted 48, and surface 78b adapted to mate with the filter 28. An orthoganal bore 80 is adapted to provide communication between the nut 54 and return port 38 and the discharge center bore of the oil filter 28. Similarly, and off-center, orthogonal channel 82 is adapted to provide communication with the diverter inlet 52 and the supply openings of the oil filter 28. As shown in FIG. 4, in this embodiment of the system, according to the present invention, the head 58 of the nut 54 need not be threaded, but can be smooth. At the surface 78b, an externally threaded, hollow post 84 is secured coaxially with the bore 80 at the surface 78 to mount the filter 28 thereto.

To assemble the system, according to the embodiment of FIG. 4, the diverter 38 is secured to the mount 32 in the manner described above. Thereafter, an o-ring 86 is disposed between the adapter surface 78a and diverter 48 and the adapter 76 is positioned to mate its surface 78a with the diverter 48. In this position, the head 58 is inserted into the bore 80 and is closely received thereby. Set screws 88 are radially threaded through the adapter 76 to engage the head 58 to couple the adapter 76 to the head 58. Thereafter, the oil filter 28 is threadably mounted to post 84 and the supply and return conduits 66 and 74 are connected in the manner described above. In this fashion, oil returning from the engine guard 40 is directed through the channel 82 to the supply openings for the oil filter 28. Oil, having passed through the filter media of the oil filter 28, is returned to the engine through the post 84, orthoganal bore 80, nut 54 and return port 38. By virtue of the adapter 76, the system 30, according to the present invention, may be used on later model engines of the type in which components may interfere with the arrangement shown in FIGS. 2 and 3.

As a further advantage, the system according to FIG. 4, enables various sizes of oil filters 28 to be used. For example, in the model years of 1996 and later, relatively small oil filters are used because of potential interference with other components. Use of larger filters is precluded due to the lack of space. With the system of FIG. 4, and by virtue of turning the axis of the assembly 90 degrees to direct the filter connection forward, larger sizes of oil filters 28 can be used. Larger oil filters provide for the retention of a greater quantity of oil in the system to the benefits described above.

While I have shown and described certain embodiments of the present invention, it is to be understood that it is subject to many modification without departing from the spirit or the scope of the claims set forth herein.

I claim:

1. In an air-cooled motorcycle engine having an oil pump and means for mounting an oil filter, said mounting means directing oil from the pump to the filter and from the filter to the engine, an improvement comprising:

an engine guard secured to the motorcycle, said engine guard defining a closed chamber having a inlet and a outlet; and means for diverting oil discharged from the pump to the engine guard inlet for circulation through the chamber and for directing the oil from the engine guard outlet to the filter, said diverting means disposed between said mounting means and said filter, said engine guard providing cooling of the oil circulating therethrough.

2. The improvement of claim 1 wherein said diverting means includes a diverter having a discharge and a return, said diverter disposed between the mounting means and the filter, the improvement further including a supply conduit between the discharge and the inlet and a return conduit between the outlet and the return, said diverter adapted to direct oil from the pump, from the discharge, to the supply conduit and chamber for circulation therethrough, through the return conduit to the return and to direct the oil from the return to the filter from which it is returned to the engine.

3. The improvement of claim 1 further including means for bypassing the chamber to direct the oil from the pump to the filter for return to the engine.

4. The improvement of claim 3 wherein said bypassing means includes temperature control means adapted to bypass the chamber for oil temperatures below a selected value.

5. The improvement of claim 4 wherein the preselected value is 180 degrees Fahrenheit.

6. A system for cooling oil for an air cooled motorcycle engine having an oil pump, an oil filter and means for mounting the filter to the engine, said mounting means including an opening communicating with the discharge of the pump to supply oil to the filter and a port for receiving oil returning from the filter to the engine, the system comprising:

a hollow engine guard adapted to be secured to the motorcycle, at least a portion of the hollow of the engine guard defining a closed chamber having a supply end and a return end;

a diverter adapted to be disposed between said filter and mounting means, said diverter including a first channel to provide communication of oil between said opening and an outlet and a second channel to provide communication of oil between an inlet and said filter; and a first conduit to communicate oil from the outlet to the chamber at the supply end for circulation of oil therethrough and a second conduit to communicate oil from the chamber at the return end to the inlet for circulation through the filter, said engine guard transferring heat to the environment to cool said oil circulating therethrough.

7. The system of claim 6 further including means for bypassing said chamber to circulate said oil from said opening into said filter.

8. The system of claim 7 further including means for controlling said bypassing means in response to oil temperature to bypass said chamber where oil temperatures are below a preselected value.

9. The system of claim 8 wherein the preselected value is approximately 180 degrees Fahrenheit.

10. The system of claim 6 wherein said engine guard is an inverted U-shaped tube secured to the motorcycle to project to either side thereof in a position to protect the legs of a rider for the motorcycle.

11. The system of claim 6 wherein the supply end and return end are at the ends of the engine guard.

12. An improved motorcycle of the type having a frame and an air cooled engine with an oil pump and means for mounting an oil filter, said pump circulating oil through the engine, into the filter and from the filter back to the engine, the improvement comprising:

an engine guard secured to the frame, at least a portion of the engine guard defining a closed chamber having a supply end and a return end;

a diverter adapted to be disposed between said filter and mounting means, said diverter including a first channel to provide communication of oil from the pump to an outlet and a second channel to provide communication of oil between an inlet and said filter; and a first conduit to communicate oil from the outlet to the chamber at the supply end for circulation of oil therethrough and a second conduit to communicate oil from the chamber at the return end to the inlet for circulation through the filter and back to the engine, said engine guard transferring heat to the environment to cool said oil circulating therethrough.

13. In an air-cooled motorcycle engine having an oil pump and means for mounting an oil filter, said mounting means directing oil from the pump to the filter and from the filter to the engine, an improvement comprising:

an engine guard secured to the motorcycle, said engine guard defining a closed chamber having a inlet and a outlet;

means for diverting oil discharged from the pump to the engine guard inlet for circulation through the chamber and for directing the oil from the engine guard outlet to the filter, said diverting means disposed between said mounting means and said filter, said engine guard providing cooling of the oil circulating therethrough; and an adapter secured at one surface to the diverter and at another surface mounting the filter, said adapter including a bore to communicate oil from the filter to the engine and a channel to communicate oil from said diverter to the filter for filtering thereof and said one and another surfaces disposed to mount the filter at an angle relative to the mount.

14. The system of claim 13 further including means responsive to temperature to bypass the chamber to direct oil from the engine through the adapter to the filter.

15. The system of claim 14 wherein the bypassing means includes means for bypassing the chamber below a preselected temperature, said bypassing means for temperatures above the preselected temperature diverting oil to the chamber for cooling thereof.

16. The system of claim 15 wherein the preselected temperature is approximately 180 degrees Fahrenheit.

* * * * *